Feb. 7, 1939.  W. B. CLAYTON  2,146,249
HYDRAULIC VAPOR RELIEF VALVE
Filed May 29, 1936

William B. Clayton
INVENTOR
BY
ATTORNEYS

Patented Feb. 7, 1939

2,146,249

UNITED STATES PATENT OFFICE 2,146,249

HYDRAULIC VAPOR RELIEF VALVE

William B. Clayton, Waco, Tex.

Application May 29, 1936, Serial No. 82,427

10 Claims. (Cl. 137—53)

This invention relates to a valve to be connected to storage tanks containing volatile liquids, particularly storage tanks for petroleum products such as gasoline. The object of the invention is to produce a device having the benefits of a hydraulic seal and which will operate to withstand an appreciable pressure in the tank before releasing, but will release on the formation of a very slight degree of vacuum.

Generally speaking, this result is accomplished by providing two interconnected U-tubes, one of which extends substantially below the other. A valve is provided for the shallower of the U-tubes so that if vacuum is formed in the storage tank, air can be admitted through this tube, but if pressure is developed inside the storage tank this tube is closed and the pressure must be vented through the deeper tube, against the greater head of liquid therein.

Figure 1:
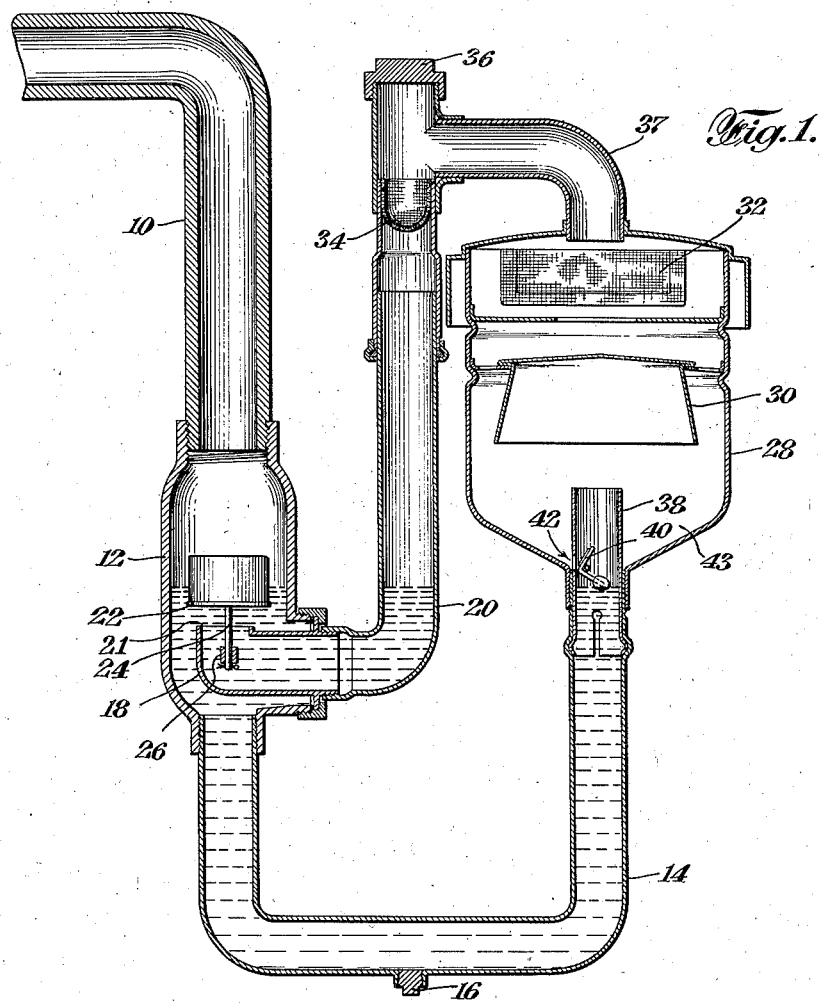
Figure 2:
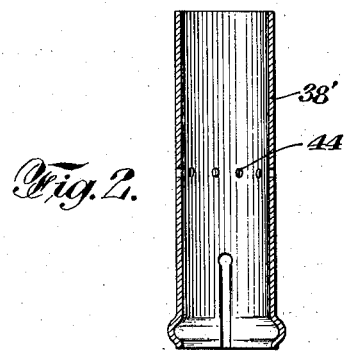

This invention may be readily understood by reference to the accompanying drawing, in which an illustrative example of my invention is shown. For the purpose of simplicity, in the drawing the two U-tubes are shown in the same plane. Actually, the device may be made somewhat more compact by arranging these tubes at right angles to each other. In the drawing Fig. 1 is a sectional view of the device, and Fig. 2 is a sectional view of one of the parts, shown in modified form and on an enlarged scale.

The numeral 10 designates a pipe which is connected to the top of a storage tank (not shown) such as a gasoline tank, and it is to be understood that if pressure develops in the tank either by volatilization of the liquid or during the filling operation, air or vapor will be forced out of the storage tank and downwardly through pipe 10. On the other hand, when liquid is discharged from the tank or when the pressure in the tank is reduced, as by condensation resulting from a lowering of the temperature, air will be sucked into the tank and upward through the pipe 10.

Screwed to the bottom of the pipe 10 is a float chamber 12 and connected to the bottom of the float chamber 12 is the U-tube formed by the pipe 14, which may be provided with a drain plug 16. The second and shallower U-tube is formed by the pipe 18 which enters the float chamber 12 and the pipe 20 which connects with the pipe 18. The mouth of the pipe 18 is formed with a valve seat 21 adapted to be closed by a float valve 22 supported on a stem 24 which slides vertically in a support bar 26 positioned in the pipe 18. I prefer to have the float chamber 12 form a part of one leg of both U-tubes but such a construction is not necessary.

The pipe 14 opens into a vent chamber 28 provided with a baffle 30 and a vent screen as at 32. The pipe 20 is provided with a strainer screen 34, a cap 36 and a branch 37 which opens into the upper part of the vent chamber 28.

In normal operation, a heavy fluid such as lubricating oil or glycerine or the like is poured into the device by removing the cap 36, and sufficient of this liquid is used to bring the level to a point approximately as shown where the float valve 22 is clear of the pipe 18.

In the drawing a condition of equilibrium is shown where the pressure inside the storage tank is the same as that outside. If an increased pressure is developed in the storage tank, the liquid level will be lowered in the float chamber 12 and as this level drops, the valve 22 will be lowered and will close the mouth of pipe 18. Accordingly, for air or vapor to escape out from the pipe 10, the liquid must be pushed down out of the float chamber and to the bottom of U-tube 14 and an appreciable pressure in the tank is required to do this. In this way valuable vapors are saved. The excess liquid will of course rise in the vent chamber 28. If we assume that the increase in pressure is gradual, bubbles of air or vapor will ultimately move through the U-tube 14 and rise through the liquid into vent chamber 28 and escape through screen 32.

If instead of developing a pressure in the gasoline storage tank, vacuum is developed, the liquid level will rise in the float chamber 12. This will lower the level in pipe 20, and since valve 22 will remain open, air will pass in through pipes 37 and 20 and quickly relieve the vacuum. It will be noted that the U-tube formed by pipes 18 and 20 is shallower than the U-tube just described for relieving excess pressure and therefore the vacuum will be relieved at a lower pressure differential than the excess pressure.

If desired, the pipe 14 may be provided with an upward extension 38 which is here shown as equipped with a valve 40 for the opening 42. The particular function of this upward extension 38 is in the case where there is a sudden increase in pressure as when the gasoline storage tank is being filled. In such case the air pressure will blow substantially all of the liquid out of pipe 14 and this liquid will be caught in a well 43 in the chamber formed by the upward extension 38 and only flow back slowly through the opening 42, thus giving substantially free venting once the liquid has been forced out of pipe 14. The valve 40 is provided so that where the increase in pressure is gradual the liquid level will have to rise to the top of the extension 38 before flowing over into the vent chamber 28. This will increase the hydrostatic head and therefore somewhat increase the normal pressure that must be developed in the tank before the venting begins.

If preferred, a different form of extension may be employed such as the one designated as 38' in Fig. 2. In this case a series of small perforations 44 are supplied so that when the liquid rises gradually it will flow out through these perforations, but when there is a sudden increase in pressure, as during filling, the liquid will be blown up over the top of the extension and only flow back very slowly into the tube 14. If preferred, the extension pipe 38 may be removed entirely.

It is obvious that the pressures at which the device will operate depend upon the depth of the two U-tubes which may be adjusted as desired, but I have found that excellent results are obtained with a device substantially in the proportions shown in the drawing where the distance from the bottom of the U-tube 14 to the top of pipe 18 is approximately 6½ inches. In such case, using a light lubricating oil as the sealing liquid, I have found that the pressure release operated at approximately 3½ ounces pressure and the vacuum release at about ½ ounce of vacuum.

It is to be understood that the foregoing examples are given only by way of illustration and that the same may be modified in many particulars without departing from the spirit of my invention.

What I claim is:

1. A device of the character described, including, in combination, means adapted to connect said device with the top of a liquid tank, a double U-tube construction adapted to receive and hold a sealing liquid and so arranged that when the pressure in the tank is equal to atmospheric pressure the surface levels of the liquid in the legs of the U-tubes are substantially identical, such construction communicating with said connecting means and including a shallow U-tube for relieving sub-atmospheric pressures in the tank and a deeper U-tube for relieving pressures greater than atmospheric, and a valve member for closing one end of said shallow tube when said double U-tube construction functions to relieve pressures greater than atmospheric, each of said U-tubes having one leg opening into a common chamber which is open to the atmosphere.

2. A device of the character described, including, in combination, a pipe adapted to be connected with the top of a liquid tank, a float chamber communicating with said pipe and adapted to receive vapor from said pipe, a plurality of U-tubes adapted to receive sealing liquid and communicating with said float chamber, one of said U-tubes being shallow for relieving sub-atmospheric pressures in the tank and another of said U-tubes being deeper for relieving pressures greater than atmospheric, a relief space containing air at substantially atmospheric pressure connected with each of said U-tubes at the end opposite said float chamber and a float valve member in said float chamber for closing one end of said shallow U-tube when the device functions to relieve pressures greater than atmospheric.

3. A device of the character described, including, in combination, a pipe adapted to be connected to the top of a liquid tank so as to receive vapor from such tank, a chamber communicating with said pipe adapted to receive such vapor, a plurality of U-tubes adapted to contain sealing liquid and communicating with said chamber, one of said U-tubes being shallow for relieving sub-atmospheric pressures in the tank and another of said U-tubes being deeper for relieving pressures greater than atmospheric, a relief space containing air at substantially atmospheric pressure connected with each of said U-tubes at the end opposite said chamber, and a valve member for closing one end of said shallow U-tube when the device functions to relieve pressures greater than atmospheric.

4. A device of the character described, including a pipe adapted to be connected with the top of a liquid tank, a U-tube construction communicating with said pipe and adapted to contain sealing liquid, a chamber communicating with one end of said U-tube construction for receiving the liquid in said U-tube construction when an excessive pressure in the tank forces the liquid from said U-tube construction to relieve such pressure from the tank and for returning such liquid to the U-tube construction after the relieving of the excessive pressure, said U-tube construction having an extension extending into said chamber, said extension being provided with a restricted opening in its side to permit slow return of the liquid to said U-tube construction after the excessive pressure is relieved, and a valve located within said extension adjacent said restricted opening and having a movable member for closing said opening under conditions of gradual increase in pressure so that the liquid rises to the top of said extension before flowing over into said chamber.

5. A device of the character described, including, in combination, a pipe adapted to be connected with the top of a liquid tank so as to receive vapor from such tank, a double U-tube construction communicating with said pipe and adapted to contain sealing liquid, said U-tube construction including a shallow U-tube or relieving sub-atmospheric pressures and a deeper U-tube for relieving pressures greater than atmospheric in the tank, and means for closing one end of said shallow tube when said double U-tube construction functions to relieve pressures greater than atmospheric, and a venting chamber opening to the atmosphere connected to one end of said deeper U-tube for receiving the liquid in said U-tube construction when a sudden excessive pressure in the tank forces the liquid from said U-tube construction to relieve said excessive pressure from the tank and for returning the liquid to said U-tube construction after the relieving of the excessive pressure, said shallow U-tube being in communication with said venting chamber.

6. A device of the character described, including, in combination, a pipe adapted to be connected to the top of a liquid tank so as to receive vapor from such tank, means associated with said pipe and including a plurality of U-tubes adapted to receive sealing liquid for relieving pressures in the tank greater or less than atmospheric pressure, one of said U-tubes being shallow and the other being deeper, and a venting chamber opening to the atmosphere, one end of said shallow U-tube being connected with said venting chamber adjacent the top of said venting chamber and said deeper U-tube being connected with said venting chamber adjacent the bottom of said venting chamber.

7. A valve for connection to a storage tank containing a volatile liquid to regulate varying pressure conditions within said tank whereby valuable vapors are saved, comprising a conduit for connecting said valve to said tank, at least two interconnected U-tubes arranged in parallel relationship and having an opening to the atmosphere, and a valve located within one of said U-tubes for regulating the flow of gases coming from said tank and thereby relieving super-atmospheric and sub-atmospheric conditions within said tank.

8. A valve for connection to a storage tank containing a volatile liquid to regulate varying pressure conditions within said tank whereby valuable vapors are saved, comprising a conduit for connecting said valve to said tank, at least two interconnected U-tubes adapted to receive a sealing liquid, a float chamber connected to said conduit and forming a part of one leg of said U-tubes, a vent chamber connected to each of said U-tubes and having an opening to the atmosphere for permitting excess gases to escape under super-atmospheric pressure conditions in said tank and permitting air to enter the valve and tank during sub-atmospheric pressure conditions to relieve vacuum conditions in said tank.

9. A valve for connection to a storage tank containing a volatile liquid to regulate varying pressure conditions within said tank whereby valuable vapors are saved, comprising a conduit for connecting said valve to said tank, at least two interconnected U-tubes adapted to receive a sealing liquid, a float chamber connected to said conduit and forming a part of one leg of said U-tubes, a valve seat and a float valve located within said float chamber for regulating varying pressure conditions, a vent chamber connected to each of said U-tubes and having an opening to the atmosphere for permitting excess gases to escape under super-atmospheric pressure conditions in said tank and permitting air to enter the valve and tank during sub-atmospheric pressure conditions to relieve vacuum conditions in said tank.

10. A valve for connection to a storage tank containing a volatile liquid to regulate varying pressure conditions within said tank whereby valuable vapors are saved, comprising a conduit for connecting said valve to said tank, at least two interconnected U-tubes adapted to receive a sealing liquid, a float chamber connected to said conduit and forming a part of one leg of said U-tubes, a valve seat and a float valve located within said float chamber for regulating varying pressure conditions, a vent chamber connected to each of said U-tubes and having an opening to the atmosphere for permitting excess gases to escape under super-atmospheric pressure conditions in said tank and permitting air to enter the valve and tank during sub-atmospheric pressure conditions to relieve vacuum conditions in said tank, one of said U-tubes being comparatively shallow so that vacuum conditions will be relieved at a lower pressure differential than said super-atmospheric pressure condition.

WILLIAM B. CLAYTON.